United States Patent [19]

Shimano et al.

[11] 3,981,649

[45] Sept. 21, 1976

[54] APPARATUS FOR PRODUCING A FOAMED THERMOPLASTIC RESIN ARTICLE

[75] Inventors: Takashi Shimano; Katsumi Orimo; Shoji Yamamoto, all of Ichihara; Masao Azuma, Chiba, all of Japan

[73] Assignee: The Furukawa Electric Co., Ltd., Tokyo

[22] Filed: Jan. 20, 1975

[21] Appl. No.: 542,396

[30] Foreign Application Priority Data

Jan. 22, 1974  Japan.................................. 49-8985
Oct. 8, 1974  Japan.............................. 49-115763

[52] U.S. Cl............................. 425/4 C; 264/45.9; 425/208; 425/817 C
[51] Int. Cl.²....................................... B29D 27/00
[58] Field of Search............... 425/4 C, 817 C, 207, 425/132, 131.1, 20 B, 4 R, 817 R; 264/50, 53, 45.9, 46.1; 137/505.12; 62/511; 138/4 D

[56] References Cited
UNITED STATES PATENTS

| | | |
|---|---|---|
| 2,987,774 | 6/1961 | Jacobson .................. 264/53 X |
| 3,088,486 | 5/1963 | Salmon et al. ............. 137/505.12 X |
| 3,352,952 | 11/1967 | Marr ........................... 425/131.1 X |
| 3,391,051 | 7/1968 | Ehrenfreund et al. .......... 425/4 C X |
| 3,461,498 | 8/1969 | Ramaika ..................... 425/207 X |
| 3,484,507 | 12/1969 | Smith ........................ 425/131.1 X |
| 3,577,360 | 5/1971 | Immel ........................ 264/53 |
| 3,856,442 | 12/1974 | Gallagher et al............ 425/817 C X |

FOREIGN PATENTS OR APPLICATIONS

| | | |
|---|---|---|
| 521,109 | 3/1955 | Italy ..................................... 264/50 |
| 875,902 | 8/1961 | United Kingdom.................. 264/50 |

*Primary Examiner*—Francis S. Husar
*Assistant Examiner*—Mark Rosenbaum
*Attorney, Agent, or Firm*—Woodling, Krost, Granger & Rust

[57] ABSTRACT

An apparatus for producing a foamed thermoplastic resin comprising an extruder including a barrel through which a thermoplastic resin is fed while being melted and a head to extrude said molten resin from said barrel, and gas injector means to inject a gas into said molten resin in said barrel through a gas injecting port in said barrel whereby said foamed thermoplastic resin article is formed by extruding said gas containing molten resin, said gas injector means characterized by comprising a gas metering means or gas flow rate setting means disposed adjacent and connected to said gas injecting port to conduct said gas therethrough while a constant flow rate is maintained, and a volume of a gas passage from said gas flow rate setting means to said gas injecting port in said barrel being sufficiently set for the gas pressure in said gas passage to respond to variation in the pressure of said molten resin in said barrel.

6 Claims, 10 Drawing Figures

APPARATUS FOR PRODUCING A FOAMED THERMOPLASTIC RESIN ARTICLE

BACKGROUND OF THE INVENTION

An apparatus for producing a foamed thermoplastic resin article is well known which comprises an extruder including a barrel through which a thermoplastic resin is fed while being melted and a head to extrude the molten resin from the barrel to a low pressure area such as atmosphere, and gas injector means to inject a gas into the molten resin in the barrel through a gas injecting port in the barrel whereby the foamed thermoplastic resin article is formed by extruding the gas containing molten resin. In case the foamed article is produced by means of such apparatus, the quantity of gas injected into the molten resin should be always constant per unit of the resin in order to produce the foamed article having a uniform expansion rate. In the prior art, the pressure of the gas injected into the molten resin has been higher than that of the molten resin in the barrel and held at a constant value and the gas has been injected into the resin in response to the difference between the gas pressure and the resin pressure. However, the pressure of the resin in the barrel tends to vary due to various factors such as variations in its temperature and a pressure in the extruder head. Thus, even though the gas pressure is held constant, the difference between the gas pressure and the resin pressure varies due to variation in the resin pressure, causing the quantity of gas injected to be changed accordingly. In this manner, it has been difficult to inject a constant quantity of gas into the molten resin and therefore, to produce a foamed article having a uniform expansion rate.

SUMMARY OF THE INVENTION

It is a principal object of the present invention to provide an apparatus for producing a foamed thermoplastic resin article of uniform expansion rate wherein a constant quantity of gas can be injected into a molten resin in an extruder barrel in spite of variation in the pressure of the molten resin in the barrel.

One of the features of the present invention is to utilize a gas metering means or gas flow rate setting means connected to a gas injecting port in an extruder barrel to conduct a gas through the setting means while a constant gas flow rate is maintained. This gas flow rate setting means may be in the form of an orifice to conduct the gas therethrough with a pressure $P_1$ on the upstream side of the orifice kept constant so that the ratio of a pressure $P_2$ of a molten resin adjacent to the gas injecting port to the pressure $P_1$ is substantially less than the critical pressure ratio of the gas to be injected. Alternatively, the gas flow rate setting means may be in the form of an arrangement of a gas flow regulator or variable orifice, an output pressure self-regulating valve provided upstream of the regulator and an input pressure self-regulating valve provided downstream of the regulator with the output side of the input pressure self-regulating valve connected to the gas injecting port in the barrel.

Another most important feature of the present invention is that a volume or capacity of the interior of a gas passage from the gas flow rate setting means to the gas injecting port is set sufficiently small for the gas pressure in the gas passage to respond to or follow variation in the pressure of the molten resin in the barrel. If the gas pressure in the gas passage will not follow the pressure of the molten resin adjacent to the gas injecting port, the quantity of gas injected into the molten resin will momentarily vary although the flow rate of gas through the flow rate setting means is set constant. More particularly, due to the compressibility of a gas, if a volume of the gas passage from the flow rate setting means to the gas injecting port is large, the pressure of gas therein cannot immediately follow variation in the pressure of the molten resin. With the justabove mentioned feature of the present invention, the gas passage of a small capacity causes the gas pressure therein to immediately follow variation in the pressure of the molten resin, with the result that the quantity of the gas injected into the molten resin can be kept substantially constant. It should be noted that the volume of the gas passage may be less than 8 percent of the volume of gas flowing through the gas flow rate setting means per minute and may be preferably less than 2 percent.

BRIEF DESCRIPTION OF THE DRAWINGS

The above and other objects and features of the present invention will be apparent from the description of preferred embodiments taken with reference to the accompanying drawings; in which.

DETAILED DESCRIPTION OF THE PREFERRED EMBODIMENTS

Figure 1:
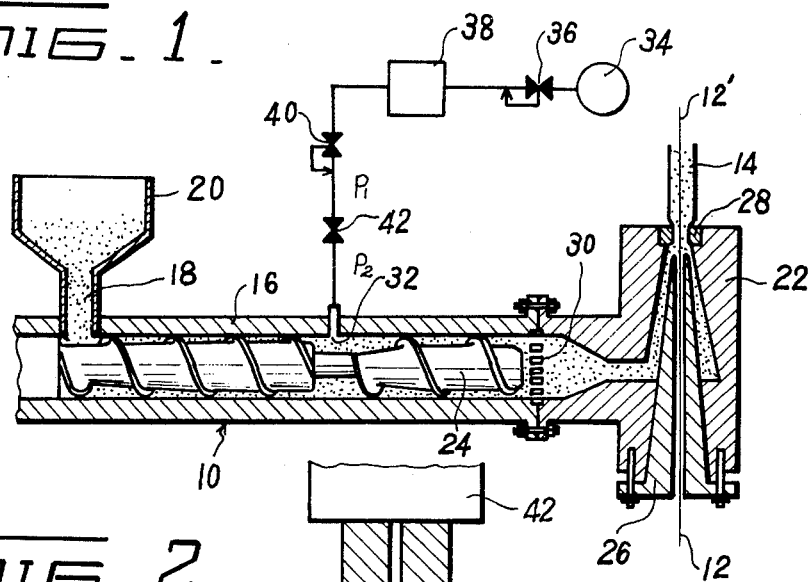
FIG. 1 is a schematic diagram of one embodiment of an apparatus in accordance with the present invention with an extruder taken in horizontal section.

Referring now to FIG. 1, there is shown an extruder 10 suitable for forming by extrusion an insulation covering 14 of a foamed thermoplastic resin on an elongate electric conductor 12 such as copper wire. The extruder 10 comprises a barrel 16, to one end of which is connected a hopper 20 to supply a thermoplastic resin 18 in the form of pellet or powder to the barrel and the other end of which is connected to a crosshead 22. Although the hopper 20 is shown to be positioned in a horizontal manner for illustration, it should be noted that it is practically positioned in a vertical manner. The thermoplastic resin from which a foamed article can be produced may include polyethylene, polypropylene, polystyrene, ethylene-vinylacetate and ionomer. An appropriate quantity of nucleating agent for foaming may be added in the resin. The nucleating agent may include azodicarbonamide and talc powder. A screw 24 is provided in the barrel 16, which serves to feed the thermoplastic resin from one end to the other end of the barrel. The screw may be connected to a power supply such as an electric motor. The barrel is also provided with a heater not shown disposed in and around the barrel and the thermoplastic resin 18 supplied from the hopper to the barrel is melted while it is forwardly fed by the screw 24 toward the crosshead 22. The molten resin is supplied to the crosshead 22 and flows around a nipple 26 disposed within the crosshead and through which the elongate conductor 12 passes to be thereby extruded on the elongate conductor at a die 28. Numeral 30 designates a breaker plate provided between the barrel 16 and the crosshead 22 as in a conventional manner.

A gas injecting port 32 is provided at the middle portion of the barrel 16 which faces on the venting zone of the screw 24 and a gas is injected through the gas injecting port into the molten resin in the barrel 16. The gas contained in the molten resin in the above manner foams the resin 18 when it is extruded from the die 28 of the crosshead 22 to the atmosphere. Thus, an insulated electric wire 12' for a communication cable having a thin foamed insulation covering 14 is produced.

The gas injector means to inject the gas into the molten resin may comprise a gas cylinder 34 from which the gas is supplied. Since the gas foaming the resin is subject to a high pressure as described later, it may be preferably $N_2$, Ne, Ar, or He such as is not liquefied by such high pressure. The gas supplied from the gas cylinder 34 passes through an output pressure self-regulating valve 36 to be adjusted to the substantially constant pressure and is then pressurized by a compressor 38 to the pressure fully higher than that of the molten resin 18 in the barrel 16. The pressurized gas is adjusted by another output pressure self-regulating valve 40 to a constant pressure $P_1$.

A gas metering means or gas flow rate setting means 42 is provided between the output pressure self-regulating valve 40 and the gas injecting port 32 in the barrel 16. This gas flow rate setting means functions to keep the flow rate of the gas therethrough constant and may comprise an orifice means to conduct the gas therethrough. In order to maintain a constant flow rate of the gas flowing through the gas flow rate setting means, the pressure $P_1$ upstream of the gas flow rate setting means may be set so that the ratio of the pressure $P_2$ of the molten resin adjacent to the gas injecting port 32 to the pressure $P_1$ is substantially less than the critical pressure ratio in the gas. Under such condition, the velocity of the gas flowing through the flow rate setting means is more than that of sound and therefore, the flow rate of the gas therethrough is determined only by the upstream pressure $P_1$ and the opening degree of the gas flow rate setting means (throttling degree) irrespective of variation in the downstream pressure $P_2$. In other words, under the above condition, if the upstream pressure $P_1$ and the opening degree of the gas flow rate setting means are constant, the flow rate of the gas through the gas flow rate setting means is kept constant regardless of variation in the downstream pressure $P_2$.

The critical pressure ratio K is determined only by the kind of the gas and supposing a ratio of specific heat of the gas is $\gamma$, the following expression is given;

$$K = \frac{2}{\gamma+1}^{\frac{\gamma}{\gamma-1}}$$

Figure 2:
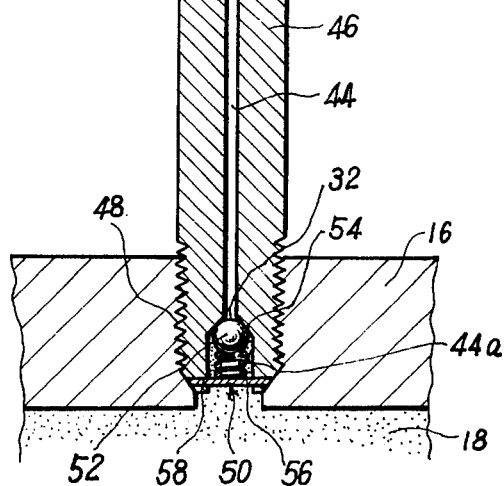
FIG. 2 is an enlarged and horizontally sectional view of a gas passage from a gas flow rate setting means to a gas injecting port in an extruder barrel.

By way of example, since $\gamma$ equals 1.4 for $N_2$ gas, the critical pressure ratio K of the gas is 0.53. Therefore, in the embodiment of FIG. 1, if the upstream pressure $P_1$ is set at a constant value of more than 1/0.53 times the pressure $P_2$ of the thermoplastic resin adjacent to the gas injecting port 32, more restrictively the maximum value of the pressure $P_2$, the flow rate of the gas through the flow rate setting means 42 can be constant regardless of variation in the pressure of the resin. A gas passage 44 leading from the gas flow rate setting means 42 to the gas injecting port 32 is shown in FIG. 2. The gas passage 44 comprises a gas conduit 46 which at one end is threaded into a threaded bore 48 in the barrel 16. The other end of the conduit 46 is connected to the gas flow rate setting means 42. A check valve means 50 may be provided at the one end of the conduit 46 for a purpose of preventing the molten resin 18 from entering the conduit. The check valve means may comprise a ball 52 disposed in an enlarged portion 44a of the gas passage 44 and a coil spring 56 serving to sealingly engage the ball 52 against a valve seat 54 provided on the surface of the enlarged portion 44a. The coil spring may be held in the compressed condition by a pin 58 extending through the conduit 46 in a traverse manner to the enlarged portion 44a. The gas injecting port 32 is provided by a gap between the ball 52 and the valve seat 54 of the check valve means 50. When any gas is not fed into the molten resin 18, the gas injecting port 32 is closed by the action of the check valve means 50, and when the gas is fed from the gas flow rate setting means through the conduit 46, since the gas depresses the ball 52 against the coil spring 56, the gas injecting port 32 is opened so that the gas is injected into the molten resin 18.

Since the flow rate of the gas through the gas flow rate setting means 42 is constant, if the pressure of the molten resin 18 should be constant in the barrel the quantity of the gas injected into the resin would be constant. However, as previously described, the pressure of the molten resin 18 varies due to various factors. Since a gas is compressible, as also previously described, the gas pressure in the gas passage 44 cannot expeditiously follow variation in the pressure of the resin 18. This causes variation in the difference between the gas pressure in the gas passage 44 and the pressure of the resin to thereby vary the quantity of the gas injected. In order to restrain variation in the quantity of the gas injected, the gas pressure in the gas passage 44 is required to expeditiously follow variation in the pressure of the molten resin 18. The most important feature of the present invention is that a volume or capacity of the gas passage 44 from the gas flow rate setting means 42 to the gas injecting port 32 is sufficiently small to neglect the compressibility of the gas in order to meet the requirement. Thus, the small capacity of the gas passage permits the gas pressure in the gas passage to expeditiously follow variation in the pressure of the molten resin 18 in the barrel. Because the gas of constant flow rate is always supplied through the flow rate setting means to the gas passage 44, response of the gas pressure in the gas passage to variation in the pressure of the resin 18 is based on the capacity of the gas passage 44 and on the flow rate of the gas through the gas flow rate setting means.

We made tests on gas injection in case the capacity of the gas passage 44 and the gas flow rate of the flow rate setting means were changed to various values. In case the ratio of the volume $V_1$cc of the gas passage 44 to the volume (at normal state) $V_2$cc of the gas through the gas flow rate setting means 42 per minute, $V_1/V_2 \times 100(\%)$ is larger than 8%, variation in the pressure in the gas passage 44 based on variation in the pressure of the molten resin 18 is scarcely observed. However, as the ratio approaches 8%, the pressure in the gas passage 44 varies following variation in the pressure of the molten resin 18, with the result that the quantity of the gas injected is substantially constant. As the ratio is further lower, the pressure in the gas passage 44 varies expeditiously following variation in the pressure of the molten resin, resulting in improved response. Most preferably, in case the ratio is less than 2%, variation in the pressure in the gas passage 44 precisely follows slight variation in the pressure of the molten resin 18 and it was observed that in this condition the quantity of the gas injected was substantially constant.

Now, one example of the test of the present invention will be described hereinafter. By using the apparatus of FIGS. 1 and 2, a thermoplastic resin was foamedly extruded on an electric conductor to produce an insulated electric wire for a communication cable under the following conditions;

| | |
|---|---|
| Extruder: | 65 mm. diameter, L/D 30. The screw was vent type. |
| Resin: | Low density polyethylene, Density of 0.928 g/cm$^3$, Melt Index of 0.3 g/10 min |
| Number of revolution of screw: | 43 r.p.m. |
| Electric Conductor: | Copper wire of 0.65 mm. diameter. |
| Line speed: | 1,500 m/min. |

Figure 4:
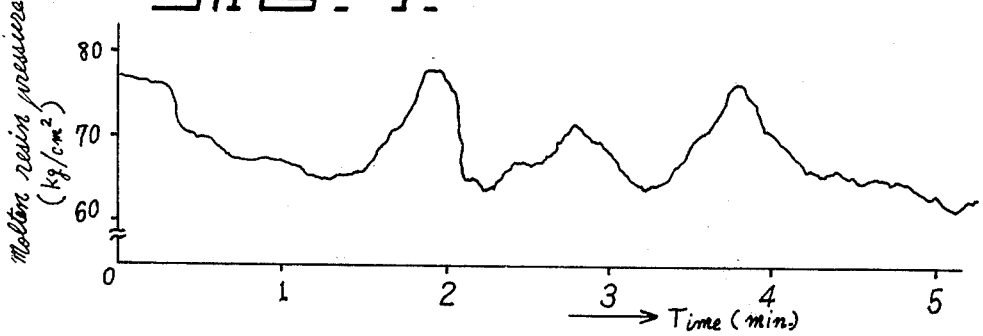
FIG. 4 is a graph showing with time variation in a pressure of a molten resin adjacent to the gas injecting port when no gas is injected into the molten resin in the barrel.

FIG. 4 shows with time variation in the pressure of the molten resin adjacent to the gas injecting port when any gas was not injected into the resin in extrusion under the above conditions. It will be noted from this figure that the pressure of the molten resin varies in an irregular manner and over a wide range.

Figure 5A:
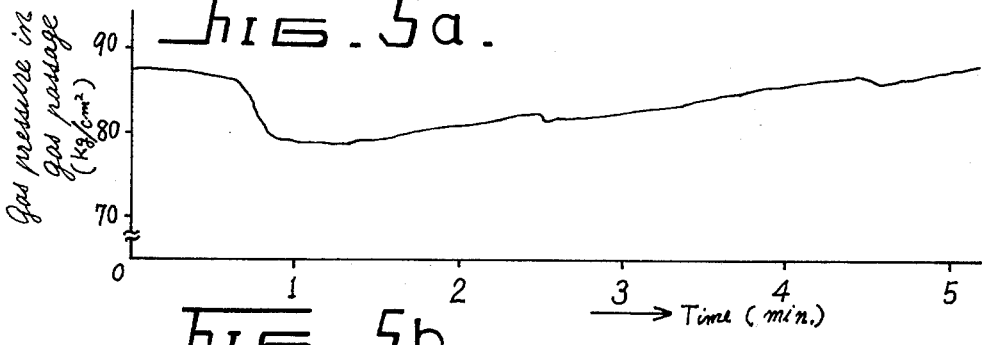
FIGS. 5a to 5c are graphs showing with time variations in a pressure of the gas passages when a gas is injected into the molten resin through various gas passages of different capacities at a constant flow rate of the gas.
Figure 5B:
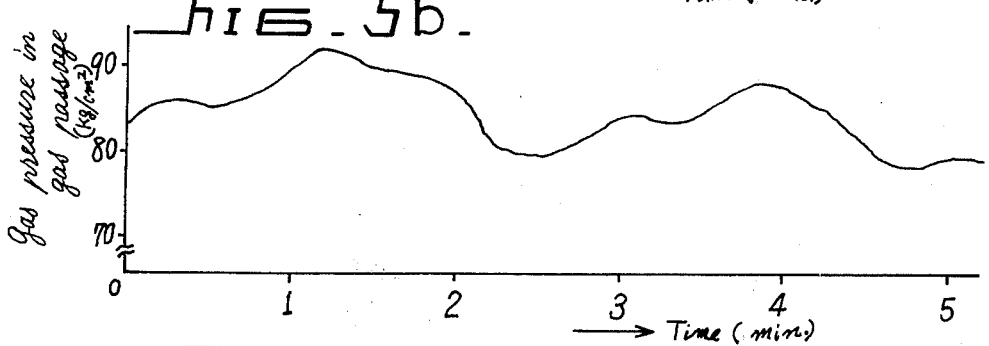
Figure 5C:
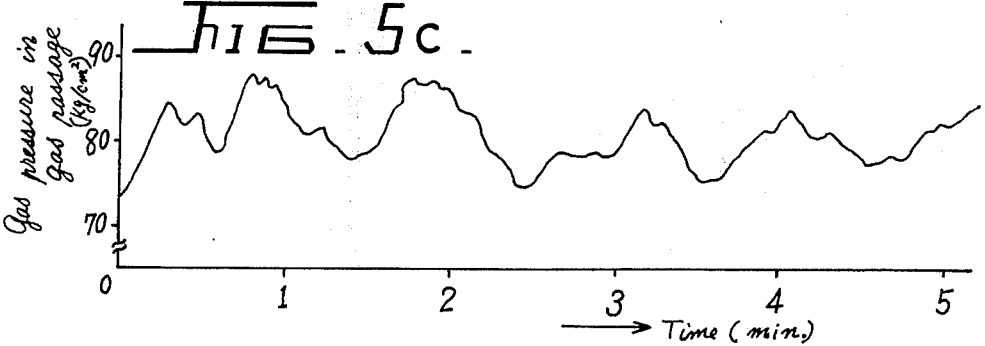

FIGS. 5a to 5c show with time variations in the pressure in the gas passage 44 in various capacities when the flow rate of the gas through the flow rate setting means 42 has a constant value of 200 cc min. at normal state under the same conditions. In case the capacity of the gas passage 44 is 20 cc, 10% of the gas flow rate, as shown in FIG. 5a, variation in the pressure in the gas passage 44 was substantially gentler than that in the pressure of the resin as shown in FIG. 4 and it is found that it could not follow variation in the pressure of the resin. Accordingly, the difference between the gas pressure in the gas passage 44 and the pressure of the resin adjacent to the gas injecting port and thus the quantity of gas injected always varied and as a result, a foamed article of uniform expansion rate could not be produced. In case the capacity of the gas passage 44 was 14 cc, 7% of the gas flow rate, the gas pressure in the gas passage presented gentle variation as shown in FIG. 5b, but it will be noted that it followed relatively larger variation in the pressure of the resin. With such variation in the gas pressure appearing, the difference between the gas pressure and the resin pressure was sufficient to maintain the substantially uniform or constant quantity of gas injection. Thus, a foamed article of relatively stabler expansion rate could be produced. Finally, in the event that the capacity of the gas passage 44 was 3 cc, 1.5% of the gas flow rate, it will be noted from FIG. 5c that the pressure in the gas passage presented variation substantially following that in the resin pressure. Accordingly, in this case, the quantity of gas injected into the molten resin 18 was more substantially uniform or constant and therefore, a foamed article of substantially uniform expansion rate could be produced.

Figure 6A:
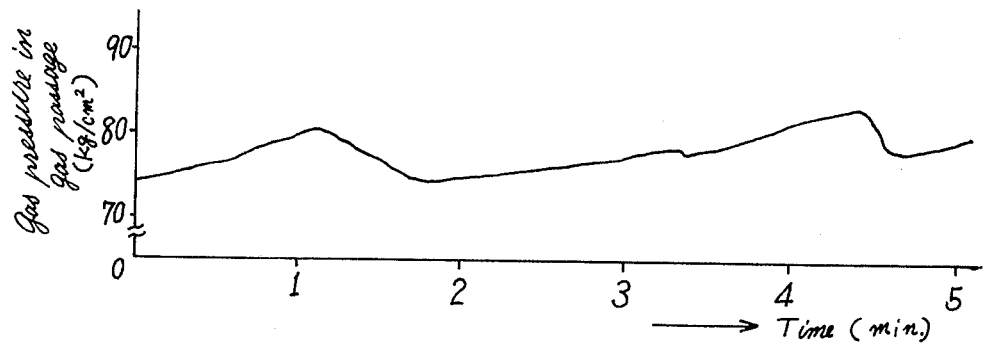
FIGS. 6a to 6c are graphs showing with time variations in a pressure of the gas passages when a gas is injected into the molten resin through various gas passages of different capacities with another constant flow rate of gas.
Figure 6B:
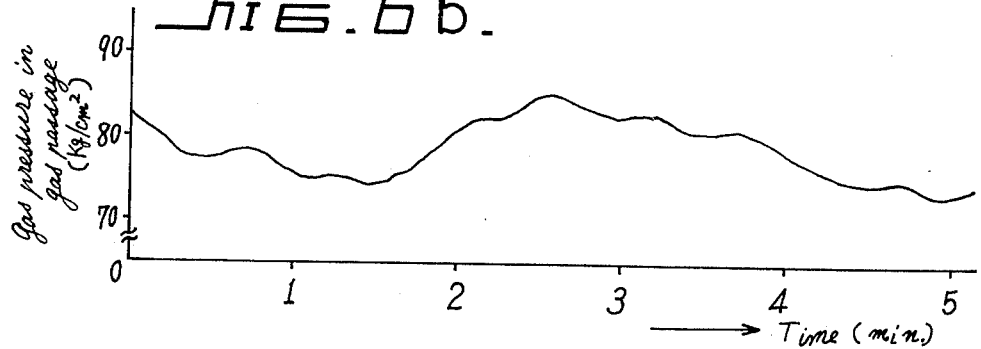
Figure 6C:
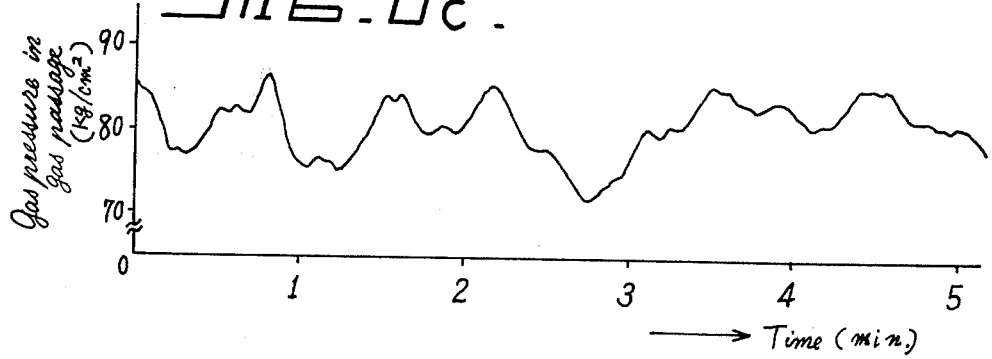

FIGS. 6a to 6c also show with time variations in the pressure in the gas passage 44 in various capacities when the flow rate of the gas through the flow rate setting means 42 has a constant value of 400 cc/min. (at normal state) under the same conditions as previously described. FIG. 6a shows variation in the gas pressure in the gas passage 44 when its capacity was 40 cc, 10% of the gas flow rate, FIG. 6b when it was 28 cc, 7% and FIG. 6c when it was 6 cc, 1.5%, respectively. It will be also noted that these examples had the same tendency as described in connection with the examples of FIGS. 5a to 5c.

Now, some examples of the present invention and some comparisons will be described hereinafter in producing a foamed insulated electric wire by using the apparatus of FIGS. 1 and 2. The conditions in these manufactures were as follows;

| | |
|---|---|
| Resin: | Low density polyethylene, Density of 0.928 g/cm$^3$, Melt Index of 0.3 g/10 min. A nucleating agent of azodicarbonamide was added 0.15% by weight in the resin. |
| Gas: | $N_2$ |
| Extruder: | 65 mm. diameter, L/D 30, Screw was vent type and gas injecting port was provided at the vent portion. |
| Number of revolution of the screw: | 43 r.p.m. |
| Upstream pressure ($P_1$) | 200 kg/cm$^2$ |
| Air gap between the outlet of die and the inlet of cooling through: | 50 cm. |
| Electric conductor: | Copper wire of 0.65 mm. diameter. |
| Line speed: | 1,500 m/min. |
| Measurement time: (operating time) | 3 hr. |

Electrostatic capacities (pF/m) of the produced electric wires when the gas flow rate and the capacity of the gas passage varied in various manner are as shown in the following table.

Table

| | Flow rate of gas through gas flow rate setting means $V_1$cc/min. at normal state | Capacity of gas passage $V_2$cc | $V_1/V_2 \times 100\%$ | Electrostatic capacity of electric wire pF/m |
|---|---|---|---|---|
| Example 1 | | 21 | 7 | 295 ± 11 |
| Example 2 | 300 | 4.5 | 1.5 | 295 ± 4 |

Table-continued

| | Flow rate of gas through gas flow rate setting means $V_1$ cc/min. at normal state | Capacity of gas passage $V_2$ cc | $V_1/V_2 \times 100\%$ | Electrostatic capacity of electric wire pF/m |
|---|---|---|---|---|
| Comparison 1 | | 30 | 10 | $295 \pm 43$ |
| Example 3 | | 28 | 7 | $260 \pm 9$ |
| Example 4 | 400 | 4.5 | 1.5 | $260 \pm 3$ |
| Comparison 2 | | 40 | 10 | $260 \pm 39$ |
| Example 5 | | 35 | 7 | $215 \pm 9$ |
| Example 6 | 500 | 7.5 | 1.5 | $215 \pm 3$ |
| Comparison 3 | | 50 | 10 | $215 \pm 45$ |

In the above table, a little variation in the electrostatic capacity means a stable expansion rate of the foamed thermoplastic resin. It will be seen from the table that Examples 1 to 6 of the present invention have stabler expansion rate than Comparisons 1 to 3 have.

Figure 3:
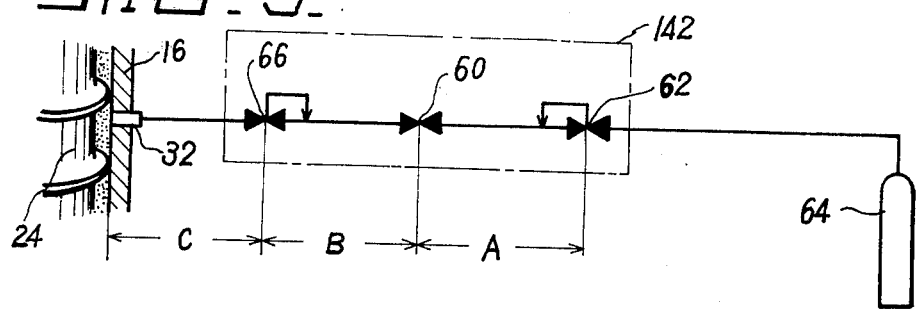
FIG. 3 is a schematic diagram of a modification of the gas flow rate setting means.

Referring now to FIG. 3, there is shown an apparatus of the present invention provided with a modified gas flow rate setting means 142. The same numerals designate the same components. The gas flow rate setting means may comprise a metering valve or flow rate regulating valve 60 which has the upstream side connected to the output of an output pressure self-regulating valve 62 which has the input connected to a gas cylinder 64. The flow rate regulating valve 60 has the downstream side connected to an input of an input pressure self-regulating valve 66, which has the output connected to the gas injecting port 32 of the barrel 16 of the extruder. The gas injecting port 32 may be in the form of check valve as shown in FIG. 2.

The flow rate of gas through the gas flow rate setting means 142 can be determined by adjusting the flow rate regulating valve 60. The pressure on the upstream side (section A) of the valve 60 is held constant by means of the output pressure self-regulating valve 62 while the pressure on the downstream side (section B) of the valve 60 is held constant by means of the input pressure self-regulating valve 66. Thus, the predetermined gas flow rate can be maintained.

Supposing the pressures in the sections A and B are $P_A$ and $P_B$, respectively ($P_A > P_B$) and supposing the opening degree of the flow rate regulating valve 60 is $R_{60}$, the quantity $Q_{60}$ of gas through the flow rate regulating valve 60, when it is considered in disregard of temperature dependence, is expressed by $Q_{60} = f(R_{60}, P_A, P_B)$ and therefore, $Q_{60}$ can be kept constant by holding $R_{60}$, $P_A$ and $P_B$ constant. If $P_C < P_B$ is met, wherein $P_C$ expresses the pressure in section C downstream of the input pressure self-regulating valve 66, the quantity $Q_{66}$ of gas through the input pressure self-regulating valve 66 can be expressed by $Q_{66} = f(R_{66}, P_B, P_C)$ wherein $R_{66}$ is the opening degree of the input pressure self-regulating valve 66. Since $P_B$ is kept constant and since the volume of the section B is constant, $Q_{66}$ must equal $Q_{60}$. More particularly, the input pressure self-regulating valve 66 self-regulates the opening degree $R_{66}$ so as to keep $P_B$ constant when $P_C$ varies, and as a result $Q_{66}$ is maintained to equal $Q_{60}$. Thus, the flow rate of gas through the gas flow rate setting means 142 has a constant value based on the opening degree of the flow rate regulating valve 60.

The pressure $P_C$ to which the input pressure self-regulating valve 66 self-regulatively responds is affected by the pressure of the molten resin and the response to the resin pressure is required to be as high as possible. The reasons are that if otherwise, the input pressure self-regulating valve 66 is regulated so as to keep the gas flow rate constant in a retarded manner and that the quantity of gas varies which is injected through the gas injecting port 32 into the resin 18. For this purpose, the capacity or volume of the gas passage in the section C is small sufficiently to expeditiously respond to variation in the pressure of the resin in the same manner as described in connection with the foregoing embodiment. More particularly, the ratio of the volume $V_1$ of the section C to the volume $V_2$ of the gas through the gas flow rate setting means 142 per minute, $V_1/V_2 \times 100\%$ is less than 8% and more preferably less than 2%. With the volume $V_2$ of the gas passage in the section C determined in this manner, the pressure $P_C$ can expeditiously respond to the pressure in the molten resin in the barrel 16. The sensitivity of the gas flow rate setting means 142 tends to vary also based on the volume of the gas passage in the section B. The input pressure self-regulating valve 66 detects the pressure in the section B to self-regulate the opening degree so as to keep the pressure $P_B$ constant and therefore, the pressure $P_C$ varies in response to variation to the pressure of the molten resin adjacent to the gas injecting port 32. As a result, in the event that the volume of the section B is large, as $Q_{66}$ varies, the pressure $P_B$ varies with time in a gentle manner and therefore, it takes long time for $Q_{66}$ to equal $Q_{60}$. For the above reason, the small volume of the section B is preferable in view of improved response.

Example and Comparison of foamedly extruding a thermoplastic resin on an electric conductor by using the apparatus of FIG. 3 are as follows;

EXAMPLE

The gas flow rate setting means 142 was connected to the extruder as shown in FIG. 1 and material to be extruded was high density polyethylene containing 2 percent by weight of talc as nucleating agent. Electric conductor was copper wire of 0.5 mm. diameter and thickness of the insulating covering was 0.125 mm. An intended electrostatic capacity of the produced electric wire was 270 pF/m and the velocity of copper wire was 1,000 m/min. In this example, $N_2$ gas was used and set by the gas flow rate setting means 142 so that the volume of the gas flowing through the gas flow rate setting means per minute was 200 cc at normal state and the volume of the section C of FIG. 3 was 2 cc, 1% of that of the gas through the gas flow rate setting means. The electrostatic capacity of the thus produced electric wire was 270 ± 6 pF/m.

COMPARISON

The conditions were the same as in Example, except that the volume of the gas passage in the section C was 50 cc, 25% of the gas flow rate. The electrostatic capacity of the thus produced electric wire was 270 ± 20 pF/m.

Although some preferred embodiments have been illustrated and described with reference to the accompanying drawings, they are by way of illustration and not intended to define the present invention thereto and it will be apparent that various changes and modifications may be made without departing from the spirit and scope of the present invention, which is intended to be defined to the appended claim.

What is claimed is:

1. An apparatus for producing a foamed thermoplastic resin article comprising an extruder including a barrel through which a thermoplastic resin is fed while being melted and a head to extrude said molten resin from said barrel to a lower pressure area, and gas injector means to inject a gas into said molten resin in said barrel through a gas injecting port in said barrel whereby said thermoplastic resin article is formed by extruding said gas containing molten resin, said injector means characterized by comprising gas flow rate setting means disposed adjacent and connected to said injecting port to conduct said gas therethrough while a constant gas flow rate is maintained irrespective of variation in the downstream pressure, and the volume of a gas passage from said gas flow rate setting means to said gas injecting port in said barrel being set sufficiently small for the gas pressure in said gas passage to respond to variation in the pressure of said molten resin in said barrel, said volume of said gas passage being less than 8 percent of the volume (at normal state) of said gas flowing through said gas flow rate setting means per minute.

2. An apparatus as set forth in claim 1, wherein the volume of said gas passage is less than 2 percent of the volume (at normal state) of said gas flowing through said gas flow rate setting means per minute.

3. An apparatus as set forth in claim 1, wherein said gas flow rate setting means comprises an orifice means and wherein a pressure $P_1$ on the upstream side of said orifice means is kept constant so that the ratio of a pressure $P_2$ of the molten resin to said pressure $P_1$ is substantially less than the critical pressure ratio of said gas.

4. An apparatus as set forth in claim 2, wherein said gas flow rate setting means comprises an orifice means and wherein a pressure $P_1$ on the upstream side of said orifice means is kept constant so that the ratio of a pressure $P_2$ of the molten resin to said pressure $P_1$ is substantially less than the critical pressure ratio of said gas.

5. An apparatus as set forth in claim 1, wherein said gas flow rate setting means comprises a flow rate regulating valve, an output pressure self-regulating valve provided upstream of said flow rate regulating valve and an input pressure self-regulating valve provided downstream of said flow rate regulating valve.

6. An apparatus as set forth in claim 2, wherein said gas flow rate setting means comprises a flow rate regulating valve, an output pressure self-regulating valve provided upstream of said flow rate regulating valve and an input pressure self-regulating valve provided downstream of said flow rate regulating valve.

* * * * *